US008583919B2

(12) United States Patent
Sarela et al.

(10) Patent No.: US 8,583,919 B2
(45) Date of Patent: Nov. 12, 2013

(54) MOBILITY HANDLING FOR MULTICAST SERVICES (75) Inventors: Mikko Sarela, Kauniainen (FI); Pekka Nikander, Jorvas (FI)

(73) Assignee: Telefonaktiegolaget L M Ericsson (Publ), Stockholm (SE)

( * ) Notice: Subject to any disclaimer, the term of this patent is extended or adjusted under 35 U.S.C. 154(b) by 194 days.

(21) Appl. No.: 13/123,953

(22) PCT Filed: Oct. 23, 2008

(86) PCT No.: PCT/EP2008/064368
§ 371 (c)(1),
(2), (4) Date: Apr. 13, 2011

(87) PCT Pub. No.: WO2010/045977
PCT Pub. Date: Apr. 29, 2010

(65) Prior Publication Data
US 2011/0202761 A1   Aug. 18, 2011

(51) Int. Cl.
H04L 29/06   (2006.01)
(52) U.S. Cl.
USPC .......................................... 713/163; 370/312
(58) Field of Classification Search
USPC ......................................................... 713/163
See application file for complete search history.

(56) References Cited

U.S. PATENT DOCUMENTS

2006/0274693 A1* 12/2006 Nikander et al. .............. 370/331
2010/0202344 A1*  8/2010 Kawakami .................... 370/328

FOREIGN PATENT DOCUMENTS

EP   1976319 A   10/2008

OTHER PUBLICATIONS

P. Nikander, An IPv6 Prefix for Overlay Routable Cryptographic Hash Identifier (ORCHID), Feb. 14, 2007 pp. 1-10.*
Castelluccia, C., et al., Securing Group Management in IPv6 with Cryptographically Generated Addresses <draft-irtf-gsec-sgmv6-0.1.txt>, IETF Standard-Working-Draft, Internet Engineering Task Force, IETF, CH, No. 1, Jul. 1, 2002, 32 pages, XP015003727.
Hardjono, T., et al., "The Multicast Group Security Architecture", rfc 3740.txt, IETF Standard, Internet Engineering Task Force, IETF, CH, Mar. 1, 2004, 26 pages, XP015009520.
Soliman, H., Hierarchical Mobile IPv6 Mobility Management (HMIPv6); rfc 4140.txt, IETF Standard, Internet Engineering Task Force, IETF, CH, Aug. 1, 2005, 20 pages, XP015041862.
Sakarindr, P., et al., "Security Services in Group Communications Over Wireless Infrastructure, Mobile Ad Hoc, and Wireless Sensor Networks", IEEE Wireless Communications, IEEE Service Center, Piscataway, NJ, US, vol. 14, No. 5, Oct. 1, 2007, 20 pages, XP011198491.

(Continued)

Primary Examiner — Kambiz Zand
Assistant Examiner — Ghodrat Jamshidi
(74) Attorney, Agent, or Firm — Rothwell, Figg, Ernst & Manbeck, P.C.

(57) ABSTRACT

A method of handling mobility of a sender in a multicast packet sending scenario. The method comprises firstly establishing a multicast tree across a packet data network and transmitting multicast packets from the sender to a plurality of receivers via said multicast tree. Prior to a mobility event in respect of said sender, a suitable transfer anchor node is identified within said network, and the tree re-rooted to that transfer anchor node. Subsequently, multicast packets are transmitted from said sender to said transfer anchor node and injected into the multicast tree at said transfer anchor node. Following said mobility event, said sender continues to send multicast packets to said transfer anchor node for injection into the multicast tree.

15 Claims, 9 Drawing Sheets (56) References Cited

OTHER PUBLICATIONS

Schmidt, T.C., et al., "Seamless Multicast Handover in a Hierarchical Mobile IPv6 Environment (M-HMIPv6)" <draft-schmidt-waehlisch-mhmipv6-0.txt>, IETF Standard-Working-Draft, Internet Engineering Task Force, IETF, CH, No. 4, Nov. 1, 2005, 17 pages, XP0150043043.

Aura, T., Microsoft Research, "Cryptographically Generated Addresses (CGA)", rfc 3972.txt, IETF Standard, Internet Engineering Task Force, IETF, CH, Mar. 1, 2005, 22 pages, XP015009744.

Nikander, P., Ericsson Research Nomadic Lab, et al., "An IPv6 Prefix for OverlayRoutable Cryptographic Has Identifiers (ORCHID)", rfc 4843.txt, IETF Standard, Internet Engineering Task Force, IETF, CH, Apr. 1, 2007, 14 pages, XP015050687.

* cited by examiner

MOBILITY HANDLING FOR MULTICAST SERVICES

CROSS-REFERENCE TO RELATED APPLICATION

This application is a 35 U.S.C. §371 National Phase Entry Application from PCT/EP2008/064368, filed Oct. 23, 2008, and designating the United States.

TECHNICAL FIELD

The present invention relates to mobility handling for multicast services and in particular to the handling of source mobility.

BACKGROUND

In the context of packet data transmission networks, the term "multicast" is a network addressing method for the simultaneous delivery of information to a group of destinations. Multicast uses the most efficient strategy to deliver the messages over each link of the network only once, creating copies only when the links to the multiple destinations split (typically network switches and routers). Multicast is often used for streaming media and Internet television applications. Multicast is in use in the existing Internet architecture. IP Source Specific Multicast (SSM) as described in IETF RFCs 3569 and 4607 is one such multicast service. In addition, multicast will be employed in future networks that employ the publish/subscribe (or pub/sub) paradigm. Pub/sub networks will only deliver data to a user when that user has subscribed to that data. Data is published in the network by a publisher and is typically accompanied by some cryptographically generated signature that serves both to identify the publisher and the data itself. In a pub/sub network context, a multicast may arise when multiple subscribers subscribe to the same data stream. The collaboration project known as "PSIRP" is currently working in this area.

A given multicast group is typically identified by both the multicast group address and by the source address. In an IP context, the multicast address is an address selected from a specified range of (IPv6) addresses, whilst the source address is the IP address of the sender. A subscriber subscribes to a multicast group by registering with one of the multicast routers, using the multicast group address and the source address. In the case of a mobile sender whose IP address may change when a handover is performed (between access routers), in order to maintain the multicast during and following handover, the mobile node may be associated with a stable anchor node. In this case, it is an IP address of the anchor node that is the source address of the multicast, with data potentially being tunneled between the sender and the anchor node. Such a solution is presented in C. Jelger and T. Noel. 2002, "Supporting Mobile SSM sources for IPv6 (MSSMSv6)", Internet Draft—work in progress (expired), (January 2002).

It will be appreciated however that sender mobility may easily render an existing multicast tree inefficient, causing problems similar to triangular routing in Mobile IP. When the sender moves, an anchor node in the multicast tree typically does not, which means that the sender may end up in a location far away from the next hop node in the multicast tree. If the sender continues to send using the existing multicast tree, the situation may result in the unnecessary duplication of traffic (as several next hops may share new links at the new location) and inefficient routing. On the other hand, if the sender requests that the network immediately reorganise the multicast tree so that it will be rooted at the new location of the sender [as described in Thomas C. Schmidt and Matthias Wählisch. 2006a, "Morphing distribution trees—On the evolution of multicast states under mobility and an adaptive routing scheme for mobile SSM sources", Telecommunication Systems (2006), and Thomas C. Schmidt and Matthias Wählisch. 2006b, "A First Performance Analysis of the Tree Morphing Approach to IPv6 Source Mobility in Source Specific Multicast Routing", Fifth International Conference on Networking (ICN 2006)], that may result in excessive signalling within the network.

These issues are considered further in T. Sousa, P. Mendes, and E. Monteiro. 2006: "Experimental evaluation of the source specific multicast model in mobile environments. World of Wireless, Mobile and Multimedia Networks", 2006. WoWMoM 2006. (26-29 Jun. 2006) DOI=10.1109/WOW-MOM.2006.44.

In the case of a mobile network comprising a mobile router, the mobile router is responsible for maintaining the stability of IP connections for the mobile nodes belonging to the mobile network. In particular, the mobile router takes care of mobility related signalling on behalf of the mobile nodes. Of course, when a mobile router moves, a number of mobile nodes behind that router move together, multiplying the problems identified above, potentially many times. The problems can be reduced by allowing the mobile nodes to delegate mobility related signalling rights to the mobile router as for example described in WO07134640 and WO03036916.

SUMMARY

The problems discussed above can be addressed, at least in part, by making use of a transfer anchor node, and temporarily re-routing a multicast tree at that anchor node immediately before and after the mobility event.

According to a first aspect of the present invention there is provided a method of handling mobility of a sender in a multicast packet sending scenario. The method comprises firstly establishing a multicast tree across a packet data network and transmitting multicast packets from the sender to a plurality of receivers via said multicast tree. Prior to a mobility event in respect of said sender, a suitable transfer anchor node is identified within said network, and the tree re-rooted to that transfer anchor node. Subsequently, multicast packets are transmitted from said sender to said transfer anchor node and injected into the multicast tree at said transfer anchor node. Following said mobility event, said sender continues to send multicast packets to said transfer anchor node for injection into the multicast tree.

The sender may be located at a mobile user terminal or at a mobile router. In the latter case of course, the mobile router is acting as a "proxy" for the actual originator of the multicast packets.

Said step of establishing a multicast tree across a packet data network may comprise rooting said multicast tree at a first anchor node. In this case, said step of re-rooting said multicast tree to said transfer anchor node comprises re-rooting the tree from said first anchor node to said transfer anchor node.

The step of establishing a multicast tree across a packet data network may comprise rooting said multicast tree at said sender. In this case, said step of re-rooting said multicast tree to said transfer anchor node comprises re-rooting the tree from said sender to said transfer anchor node.

According to an embodiment of the present invention, following said mobility event and after the transmission of multicast packets from said sender to said transfer anchor node for injection into the multicast tree, said multicast tree is re-rooted from said transfer anchor node to either the sender at its new location or to a further anchor node local to the sender's new location.

The step of transmitting multicast packets to an anchor node may comprise tunnelling the packets to the anchor node. In this case, the packets comprise an inner header having the multicast group address as destination address, and an outer header having the anchor node as destination address.

A multicast group address of a multicast group may be a Cryptographically Generated Address (CGA). In this case, re-rooting of a multicast tree is achieved by sending a re-rooting message across the tree, the message containing the multicast group address, an associated public key, and a signature generated using a private key associated with said Cryptographically Generated Address. This allows nodes within the multicast tree to authenticate the re-rooting message using the signature and the associated public key.

Alternatively, a multicast group address of a multicast group may be an Overlay Routable Cryptographic Hash Identifier (ORCHID). In this case, re-rooting of a multicast tree is achieved by sending a re-rooting message across the tree, the message containing the multicast group address, the associated public key, and a signature generated using a private key associated with said Overlay Routable Cryptographic Hash Identifier. This allows nodes within the multicast tree to authenticate the re-rooting message using the signature and the associated public key. More specifically, re-rooting of a multicast tree is achieved by sending two consecutive re-rooting messages across the tree, the messages containing the multicast group address, the first message containing a hash value formed with a hash chain rooted at said Overlay Routable Cryptographic Hash Identifier and the second message revealing the corresponding next hash value from the hash chain. In this case, nodes within the multicast tree can authenticate the first re-rooting message using the next hash value in the second message.

According to a second aspect of the present invention there is provided a mobile node configured to operate as a sender of packets for at least one multicast group across a packet data network. The mobile node comprises a multicast session establishment or joining unit for establishing or joining a multicast tree, and a multicast packet sender for transmitting multicast packets to a plurality of receivers via said multicast tree. The node is further provided with a multicast mobility handling unit arranged, prior to a mobility event in respect of said sender, to identify a suitable transfer anchor node within said network, to re-root said multicast tree to said transfer anchor node, and to cause said multicast packet sender to transmit multicast packets to said transfer anchor node for injection into the multicast tree both before and after said mobility event.

The multicast packet sender may be configured to tunnel multicast packets to said transfer anchor point both before and after the mobility event. Said multicast mobility handling unit may be configured, following said mobility event, to re-root said multicast tree at a further anchor point or at itself.

According to a third aspect of the present invention there is provided a node configured to route packets within a packet data network. The node comprises a multicast protocol unit for allowing the node to be integrated into a multicast tree, and configured to authenticate a tree re-rooting instruction relating to a given multicast tree using a public key associated with a cryptographically generated multicast group identity or address.

DETAILED DESCRIPTION

A mobility solution for multicast will now be considered. The solution provides for fast handoffs with little signalling at the time the sender or a mobile router moves, utilising any appropriate (e.g. existing) multicast tree generation algorithm, in a way that the solution still supports optimal routing (but at a slower pace). The proposed solution relies upon the sender (or mobile router) establishing an anchor node in the fixed network, prior to any mobility event, preferably at a location topologically close to both its current location and the expected new location. This anchor node is then configured to be the root of the multicast tree, instead of the sender. As far as the network is concerned, the multicast tree is now re-rooted at the new anchor node. The sender sends the data to the anchor node in a manner that is essentially outside of the tree, e.g., with tunnelling.

When the sender moves, it continues sending multicast data to the anchor node. Hence, the multicast part of the network does not need to immediately react to the sender movement as the source address of the multicast remains the IP address of the anchor node. Once the sender has a new stable location, the multicast tree can be re-rooted again, this time to the sender's new location.

As a further optimisation, in order to reduce signalling at the time of the mobility event, if the sender is also a receiver in a multicast tree, it can arrange for the data associated with that tree to be multicast both to its current location and to the anchor node, instructing the anchor node to drop the data until told to forward it. Then, after movement, at the same time as continuing to send data, the mobile node can instruct the anchor node to resume sending multicast data to the mobile node. The anchor node may buffer messages received for the estimated duration of the mobility events and "play" these out to the mobile node once the movement event is completed.

Figure 1:
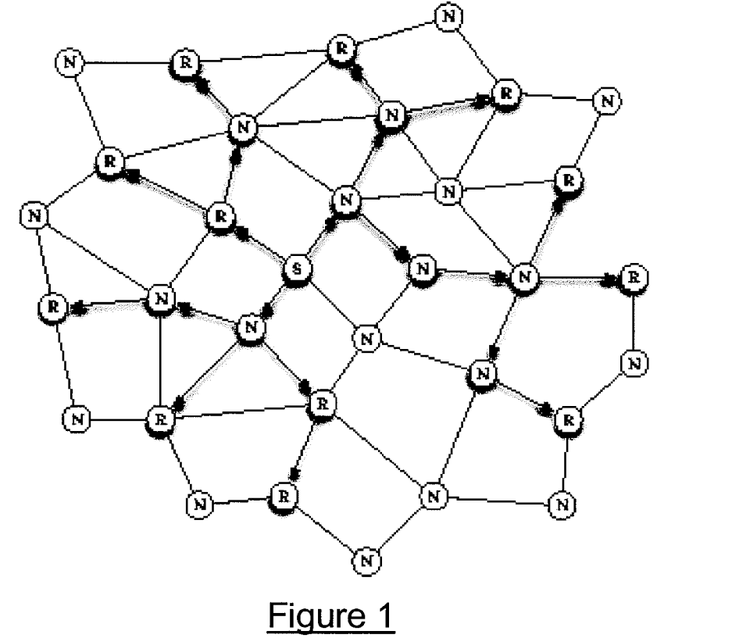
FIG. 1 illustrates schematically nodes of a network involved in providing a multicast service.

An exemplary network is illustrated in FIG. 1, with one sender S, a set of receivers R, and a set of intermediary nodes N. For any such connected network, it is possible to generate one or more trees rooted at any node by making that node the root of the tree and then recursively adding intermediary nodes and receivers until all receivers are added. Alternatively, the graph may be rooted at a given node, and then pruned to remove as many links as possible while still covering all nodes in the receiver set R. In practice, such trees are created with various distributed algorithms, and the resulting trees are used to deliver multicast data. For a detailed consideration of the basic principles involved, reference should be made to S. E. Deering. 1991, "Multicast Routing in a Datagram Internetwork", Ph.D. Thesis, Stanford University, (December 1991).

Initially, before mobility becomes involved, the sender starts sending data to one or more uniquely identified multicast channels, and a number of receivers join as "listeners" to any combination of those channels. The network forms a set of multicast trees to deliver the data to the receivers. The situation remains stationary with respect to the root of the multicast trees as long as the sender does not move.

As soon as the sender determines that it will or may want to move, it chooses and then establishes an anchor node A in the network. This anchor node will function as the root of the tree (assuming for the sake of simplicity that there is only a single multicast channel) during the mobility event. The act of picking an anchor node and making it possible to re-root the tree is regarded as a preparatory event from the network's point of view. This preparatory event may take a considerable time, depending on how extensively the tree needs to be re-grown/re-pruned. A generic method for such tree re-rooting is described in more detail below.

Subsequently, when the sender decides to move from one location to another, it achieves this using the standard mobility procedures. As the anchor node A is either already acting as the root of the multicast tree, or is at least prepared to act as the root, the moved sender can deliver its packets by simply sending them to A, which in turn will deliver them down the tree. Hence, from the viewpoint of sending multicast traffic down the tree, the mobility event does not have an impact. Once the (mobility) situation has stabilised again, i.e., the sender is not planning an imminent move, it can re-root the tree again, this time to its new location.

In the case where the sender is behind an expensive link such as a wireless link with limited transmission capacity, it may be beneficial to use multiple anchor nodes (that is "local anchor nodes") instead of one. This allows the mobile node to delegate much of the tree management signalling to the local anchor nodes, thereby reducing signalling traffic over the expensive link. For example, a local anchor node may handle most or even all of the signalling needed to re-root the tree at some other anchor node. In such a case, the sender may prefer to always send traffic trough a local anchor node $AP_1$ instead of initially acting as the root. Then, when preparing to move, it may select a balanced anchor node AP as in the case above, and re-root the tree there. Finally, after the movement the sender can establish a new local anchor node $AP_2$ in the new location, either before or after it breaks connection with the old network. Furthermore, the sender can delegate the required signalling rights to the local anchor nodes $AP_1$ and $AP_2$, thereby allowing this extended scheme to work exactly like the base case with the exception of $AP_1$ replacing the sender's old location and $AP_2$ replacing the sender's new location.

Re-Rooting a Multicast Tree

Figure 2:
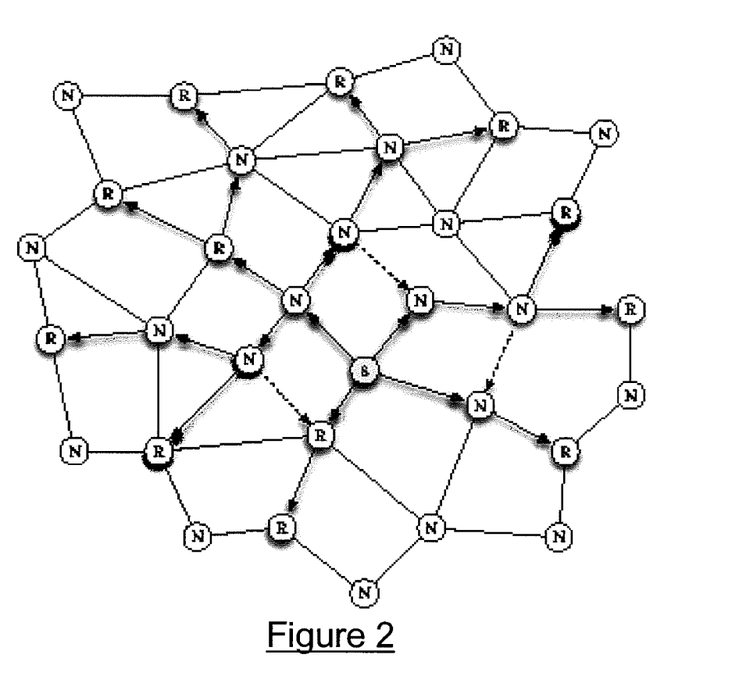
FIG. 2 illustrates schematically the network of FIG. 1 following re-routing of a multicast tree.

In general, the tree re-rooting problem is well known in the literature, and there are both parallel and distributed algorithms for solving the problem. The Schmidt references cited above consider tree re-rooting in the context of multicast. FIG. 2 shows the network of FIG. 1, with the multicast tree being re-rooted from the old root to a new root. Other references to this field include:

D. W. Wall. 1990. Mechanisms for Broadcast and Selective Broadcast. PhD thesis, Electrical Engineering Dept., Stanford University (June 1980). Also Tech. Rep. 190, Computer Systems Lab., Stanford.

L. Kou, G. Markowsky, and L. Berman. 1981. 'A Fast Algorithm for Steiner Trees. Acta Informatica, 15:141-145, 1981.

Qing Zhu, M. Parsa and J. J. Garcia-Luna-Aceves. 1995. A source-based algorithm for delay-constrained minimum-cost multicasting. INFOCOM '95. Fourteenth Annual Joint Conference of the IEEE Computer and Communications Societies. IEEE, pp. 377-385 vol. 1, (2-6 Apr. 1995).

RFC4601 Sections 3.2.-3.3. describes how an IP SSM tree is re-rooted from a rendezvous point (RP) to the sender. The same method can be used to re-root an SSM tree from an old root to a new root, as long as the identifier constraints are met. Identifiers are discussed further below. A different but still simple algorithm is presented in the Schmidt et al (2006a, 2006b) citations.

An alternative, simple algorithm for re-rooting an existing multicast tree to an arbitrary node (again, either the mobile node or a new anchor node) within a network is now presented. It is assumed that the reader is familiar with the well-known Dijkstra's algorithm (E. W. Dijkstra. 1959, "A note on two problems in connection with graphs", In Numerische Mathematik, 1 (1959), pp. 269-271) for creating a shortest-path tree and the various tree pruning methods (e.g. as suggested by S. E. Deering and D. R. Cheriton. 1990, "Multicast routing in datagram internetworks and extended LANs", ACM Trans. Comput. Syst. 8, 2 (May 1990), pp. 85-110, DOI=http://doi.acm.org/10.1145/78952.78953; and S. E. Deering. 1991. "Multicast Routing in a Datagram Internetwork", Ph.D. Thesis, Stanford University, (Dec. 1991)] to remove unnecessary edges and vertices from the tree in order to construct a multicast tree from a shortest-path tree.

The basic features of the algorithm can be explained as follows:

1. Starting from the new root, search for the closest vertex that is within the old tree. Note that there may be multiple vertices that are closest. Note also that if the new root is within the old tree, this step is trivial. Such a search can be performed, for example, in a distributed manner by the new root sending packets with gradually increasing maximum hop count, waiting after each packet for replies from any node that is part of the old tree. Alternatively, if the new root has a sufficient representation of the network graph in its disposal, it can do such a search without sending any packets, in a centralised manner.

2. Construct a tree from the new root to the closest vertex (or vertices). For example, when a node in the old tree replies to a "search packet" sent out in step 1, the nodes along the path from the old-tree node to the new root can record their identities in the reply packet, thereby forming the tree. In the centralised case where the new root has a network graph representation, the new root can reconstruct the new tree using a Dijkstra's algorithm.

3. Add all subtrees that start (flow out) from (any of) the closest vertex(vertices) to the new tree. In the distributed case, this step could be implemented by the closest vertex(vertices) as part of the step of replying to the search packet, by sending packets to the neighbours. In the centralised case, this step is trivial and could be performed by the new root.

4. Add the reversed subtree of the trunks (flow in) that end in (any of) the closest vertex(vertices). In the distributed case, this could again be performed by the closest vertex (vertices) sending packets to the neighbours. In the centralised case, this is again trivial and could be performed by the new root.

5. Remove any excess edges. In the distributed case, this could be implemented running the distributed version Deering's algorithm, but only in a localised manner. In the centralised case, this can be implemented by the new root by running the centralised version of Deering's algorithm.

This can be expressed using standard notation, assuming a graph $G=(V, E)$ and a multicast subtree $T=(G, r, V_T, E_T)$ where $V_T \subset V$ and $E_T$ is a subset of directed edges $<v,u>$ from E.

The trivial algorithm for re-rooting the tree from vertex r to vertex r' is the following:
1. Initialization:
   a) Create a set A of currently considered vertices, and initialise it to $\{r'\}$.
   b) Create a set B of vertices to be considered next, and make it empty.
   c) Create a set C of visited vertices, and make it empty.
2. Find the old tree.
   As long as none of the vertices in A is within T, i.e. $A \cap V_T = \emptyset$
   a) In parallel, consider each edge $<v,u>$ starting from the vertices in A. If $u \notin C$ and $u \notin A$, add u to B. That is, if the vertex has not been visited yet and is not being considered now, add it to the set of vertices to consider next.
   b) Mark all currently considered vertices as visited, i.e., $C:=C+A$.
   c) Continue with the next set of vertices, i.e. $A:=B; B:=\emptyset$
3. Construct a multicast tree of the visited and current nodes, rooted at r'.
   This can be implemented as a combination of two well-known steps:
   a) Apply Dijkstra's algorithm to the graph $G(A \cup C, E)$ with the root r', giving an initial new tree T'.
   b) Prune the initial new tree T' using Deering's algorithm (1991, page 84) so that it covers only the paths from the new root r' to the found vertex(es) in the old tree, i.e., $A \cap V_T$.
4. In parallel, consider each edge $<v, u>$ starting from the vertices in $A \cap V_T$. That is, consider all edges that start from those nodes that are in the intersection of the old tree and the new tree.
   a) If u is already visited or being currently considered, i.e. if $u \in A \cup C$, ignore the edge. That is, either the edge is already in the new tree or it will not be needed.
   b) If u is not in the old tree, i.e. if $u \notin V_T$, ignore the edge. This edge will not be needed for the new tree. [While considering it as a candidate to be included in the new tree will in some cases lead to a more optimal tree than the presented algorithm, it is desirable to reduce the computational complexity involved.]
   At this point, two options remain: either the vertex is a root for a subtree that flows out over the currently considered edge, or there is data flowing into the current vertex over the edge being considered.
   a) If $<v,u> \in E_T$, i.e., data is flowing out through the edge, add the whole subtree rooted at v to the new tree.
   b) If $<u,v> \in E_T$, i.e., data is flowing in through the edge, reverse the path from the present vertex to the old root and add the resulting subtree to the new tree.
5. In certain cases (as in the example in FIG. 2 above), the tree from step 3 will not be quite a tree but a DAG (directed acyclic graph), as there will be one or more different edges through which data flows to the old root or some vertex between the new and old roots. In that case, all but one of those redundant edges should be pruned; cf. page 84 of Deering (1991). Such pruning can be performed based on duplicate traffic arriving over the unnecessary edges.

Note that due to the way parallelism is built into the algorithm description above, it can be easily distributed using well-known techniques.

The main benefit of the presented algorithm is that it runs rather quickly especially in the case of sparse trees, requiring exhaustive search only to find the old tree from the new root. For example, whenever the old and new roots are close to each other, this algorithm is considerably faster than reconstructing the new tree using Dijkstra's and Deering's algorithms.

Note that, especially in the (below) typical case where the new root is selected among the vertices in the old tree, the new tree will be as optimal as the old tree and the exhaustive search is completely avoided.

Anchor Node Selection

In the present context, there are two kinds of anchor nodes. First, there are generic mobility anchor nodes that are located somewhere in the middle between any old and new locations. Second, there are local anchor nodes that should be reachable by other anchor nodes and be located close to either the old or new location of the sender.

Consider the case where the sender breaks its connection with an old access point before it establishes a connection to a new access point. This is referred to as the "break-before-make" case. In this case, the sender cannot anticipate its new location other than in some broad terms. It therefore makes sense to select a generic anchor node as far away from the sender as possible, while not going beyond the first branching point in the multicast tree. Hence, in the case where the multicast tree branches in the first access router, the anchor node should be rooted there. In the case where the multicast tree branches already at the sender, i.e., the sender itself sends multiple copies of the packets over multiple interfaces, the anchor node must still be picked outside of the sender node, preferably at some stable part of the network.

In the "make-before-break" case, i.e. where the sender establishes a connection to a new access point before breaking the connection with the old access point, the sender can estimate the topology between the old and new locations by sending packets to itself in both directions. With such topology information, the sender can try to pick a generic anchor node somewhere in the middle between the old and new locations. In a network where some level topology information is inherently available, such as in an IP network with topologically assigned addresses, a suitable location for the generic anchor node can be approximated, for example by taking the longest common address prefix of the old and new IP addresses.

Once the sender has picked a generic anchor node, the anchor node and sender need to set up a tunnel or another suitable means that allows the sender to send (authenticated) packets to the anchor node so that the anchor node can enter them into the correct multicast tree. Where multiple trees are present, the sender needs to send metadata, such as an IP extension header, that describes which of the multicast trees it is sending to. The metadata also includes necessary authentication information to allow the anchor node to become the root of the tree and inject packets to it, should the multicast protocol have security features preventing anyone from sending or assuming the mantle of root. The exact method of how to set up the tunnel or other forwarding path, as well as the type of authentication information, depends on the particular implementation. This is described further below.

It is noted that, in some implementations, the operation of sending packets from the new location to the generic anchor node may not be a trivial one and will require an explicit forwarding path to be established. In such a case the forwarding path must be set up prior to the mobility event. In the make-before-break case, it is possible to construct an exact, simple forwarding path. In the break-before-make case, it may become necessary to construct a many-to-one path towards the anchor node, creating a potential DoS problem. There are multiple potential approaches to solving the DoS problem. Firstly, the creation of a forwarding path may not require establishing state in the network, as is the case, for example, in the PSIRP Bloom Filters based embodiment, described below. Secondly, the forwarding path may be bound to the mobile node, so that no other node can send packets through it. This can be accomplished, for example, by verifying a digital signature in all forwarding nodes. Thirdly, the construction of a (stateful) many-to-one forwarding path may require any new sender first to show its honest desire to send along the path, for example, by requiring the sender to solve a digital puzzle.

Once the generic anchor node and the required tunnelling and/or forwarding state exist, the sender initiates tree re-rooting from the tree's current location to the anchor node, utilising any of the algorithms discussed above. Once the tree has been re-rooted, the sender is ready to move.

When the sender moves, it simply continues to send packets to the anchor node from its new location. This occurs regardless of difference whether the node hosting the sender moves or a whether a whole subnetwork moves. As long as the packets continue to be accepted by the generic anchor node (e.g. they carry proper authentication data), they will be injected to the multicast tree(s).

Once the sender has moved, several different options are available. Firstly, if the sender expects to move soon again and if the anchor node has been selected appropriately, the sender may continue to utilise the anchor node as the root of the multicast tree. Secondly, if the sender expects to move soon but the anchor node is in a (grossly) sub-optimal location, the sender may select a new anchor node by repeating the generic anchor selection procedure. Thirdly, if the sender does not expect to move in the near future, it may move the tree root to its present location, utilising any of the re-rooting algorithms presented above. Fourthly, if the sender does not expect to move but is behind an expensive communication link, it may select a new local anchor node $AP_2$ and re-root the tree there. This fourth solution allows the anchor node ($AP_2$) to take care of the future signalling on behalf of the mobile node, i.e. to handle the selection of the next generic anchor node and the re-rooting of the tree to that node.

An alternative approach to handling mobility will now be described and which is applicable in particular to the case where the last communication link between the network and the sender is an expensive one, e.g. a radio link. In this variation, illustrated in FIG. 3, the sender chooses two anchor nodes, $AP_1$ and $AP_2$, in the fixed network, the former close to the sender's current location and the latter close to its anticipated new location. To be more precise, $AP_1$ is chosen to minimise the added path length/delay to the multicast trees before the mobility event; likewise for $AP_2$ after the mobility event.

Figure 3:
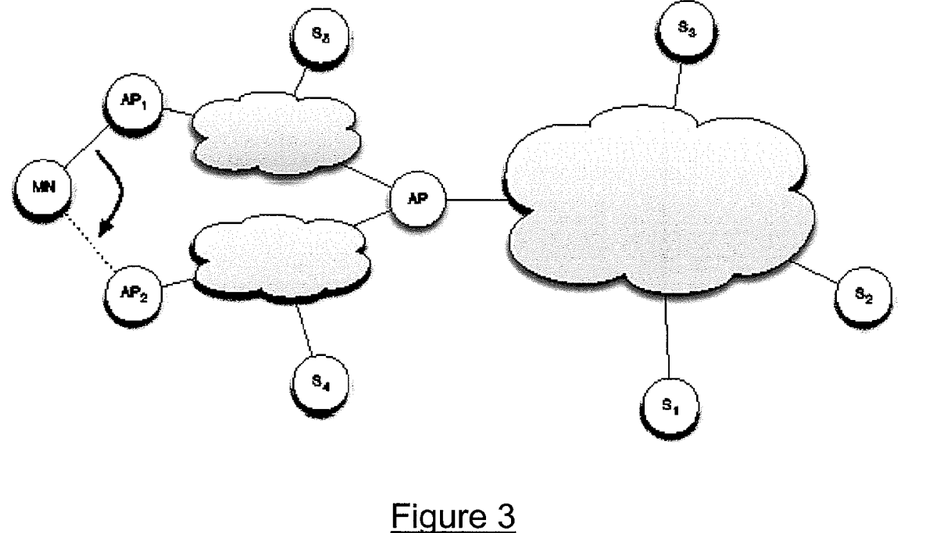
FIG. 3 illustrates an alternative approach using two anchor nodes $AP_1$ and $AP_2$.

The mobile sender initially sets up $AP_1$ as the new root of the multicast tree that it sends data to. After the mobile sender has moved, it instructs $AP_2$ to become the next root of the multicast tree. $AP_2$ sends an authenticated message to $AP_1$ informing it that it is a new root of the multicast tree. $AP_1$ then starts tunnelling or otherwise forwarding data to $AP_2$. After that, tree re-rooting to $AP_2$ is carried out as previously discussed.

The benefit of this approach is that the mobile sender can, prior to the mobility event, select $AP_1$ and $AP_2$ and transfer the root of the trees to $AP_1$, without any performance penalties and well in advance. The variation enables re-structuring of the tree from $AP_1$ to $AP_2$ with minimal communications from the mobile sender, even in the case of an unexpected mobility event. However, it only works if the sender does not need to directly send multiple packets, but that is typically the case when signalling delegation is used.

EXAMPLE EMBODIMENTS

1. Source Specific Multicast (SSM) in IP Networks

Figure 4A:
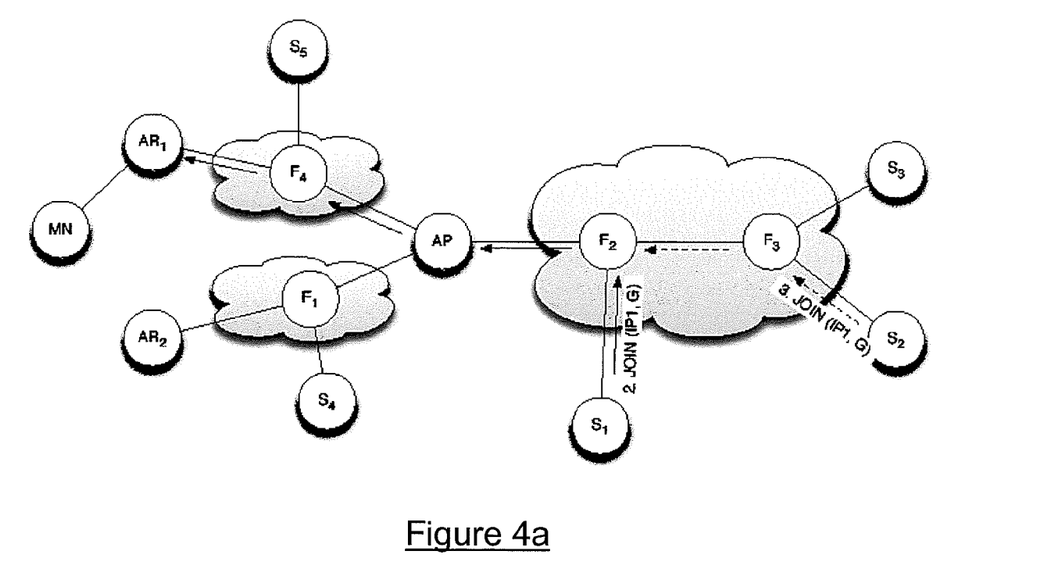
FIGS. 4a to 4f illustrate the processes involved in establishing and maintaining a multicast tree in the context of the Source Specific Multicast standard.
Figure 4B:
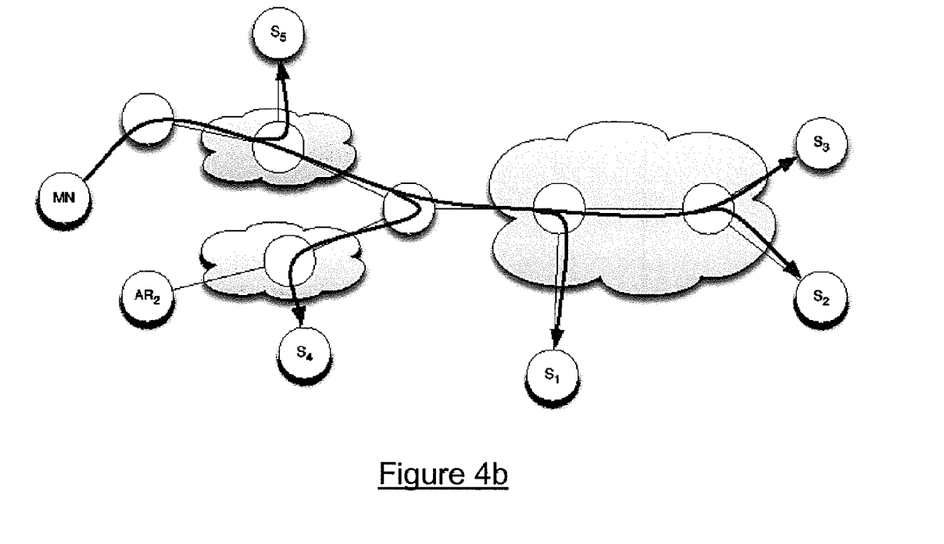

FIG. 4a illustrates the procedure to establish a multicast group according to SSM. As a first step, a mobile node (MN) is assigned an IP address IP1 from the address block owned by Access Router AR1. S1 then joins the SSM group (IP1,G). The PIM JOIN message is sent along the path S1→F2→AP→F4→AR1. S2 joins the same group. The PIM JOIN message is sent along the path S2→F3→F2. The same process is applied to S3, S4, and S5, with the paths S3→F3, S4→F1→AP and S5→S5, respectively. FIG. 4b illustrates the IP SSM PIM multicast tree after the initial formation For the Source Specific Multicast (SMM) standard (RFC 4601, RFC 4607), the mobile sender handling procedures may be embodied as follows:

A new authenticated message is sent down an existing SSM multicast tree. This message causes the tree to be re-rooted from the existing source IP address to a new source IP address, initiating the re-rooting process as described in Sections 3.2-3.3. of RFC 4601.

A new mechanism is needed to find and establish an anchor node. For example, reverse DNS could be used to store information about available anchor nodes at any IP prefix.

To address the security issues, it is proposed that the tree is associated with a Cryptographically Generated Address (CGA) (RFC 3972) or ORCHID (RFC 4843) address. Two options for authenticating the update messages are:

1. According to the specifications, both CGAs and ORCHIDs include by default a cryptographic hash of a public key. Consequently, the update messages can be authenticated by including the public key and a signature over the update message. This is structurally similar to what is already now done with Neighbour Discovery (ND) messages in SeND (RFC 3971).
2. Both the CGA and ORCHID specifications allow the address to be bound to data other than a public key. Especially in the ORCHID case, instead of taking a hash over a public key, the ORCHID can be formed by placing a hash chain anchor into an ORCHID, and using any standard hash chains or hash trees to authenticate the sequence of update messages.

Figure 4C:
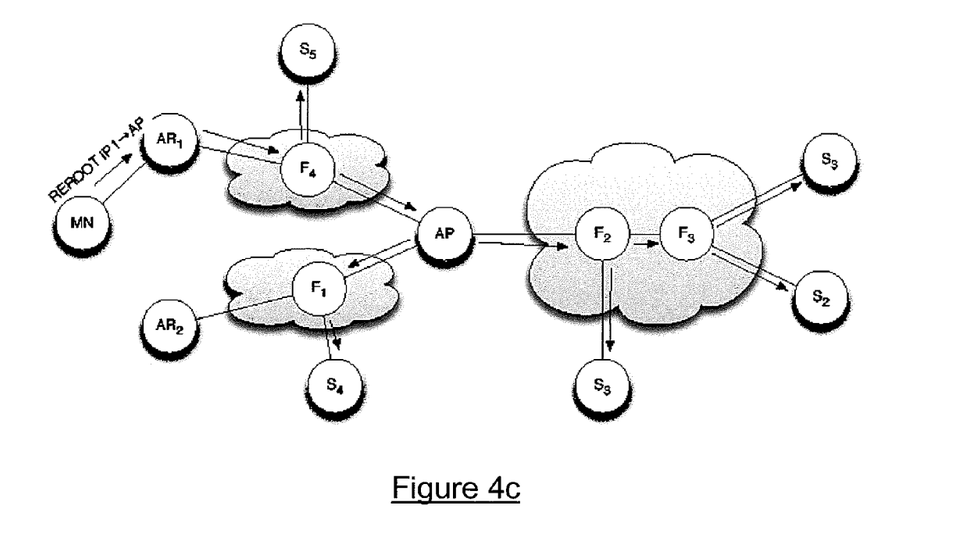

FIG. 4c illustrates IP SSM PIM re-rooting signalling before movement of the MN. The process involves the following steps:

1. MN constructs a new PIM REROOT message, places it in an IPv6 hop-by-hop (HBH) option, and sends a packet to the multicast group address G.
2. AR1 receives the packet, gets and authenticates the HBH option, and removes itself from the tree.
3. F4 receives the packet, gets and authenticates the HBH option, and reverses the link F4→AP direction.
4. AP receives the packet, gets and authenticates the HBH option, and reverses the link F4→AP direction.
5. All other nodes in the tree process the packet and merely mark the source address change IP1→AP.
6. MN starts to tunnel the packets to AP, which then sends them along the tree.

Figure 4D:
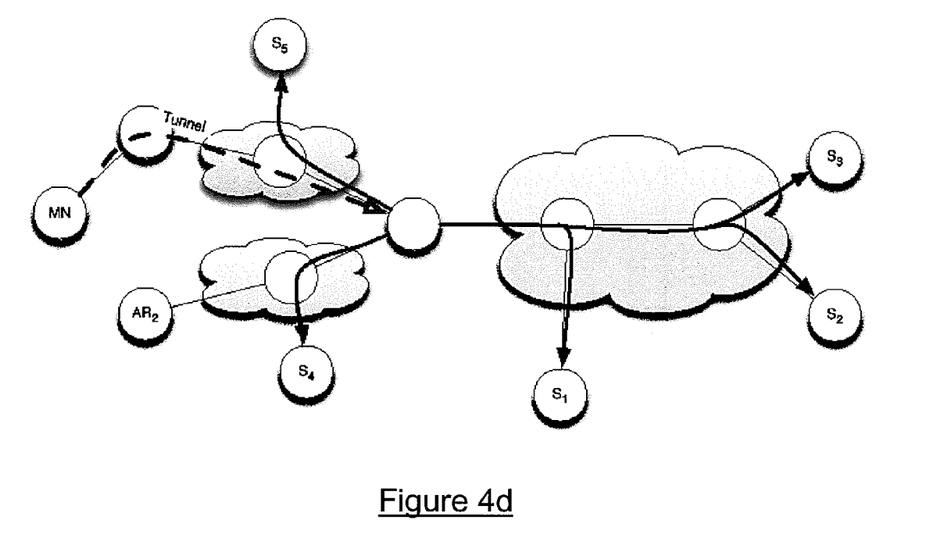

FIG. 4d illustrates the IP SSM PIM multicast tree after the first re-rooting.

Figure 4E:
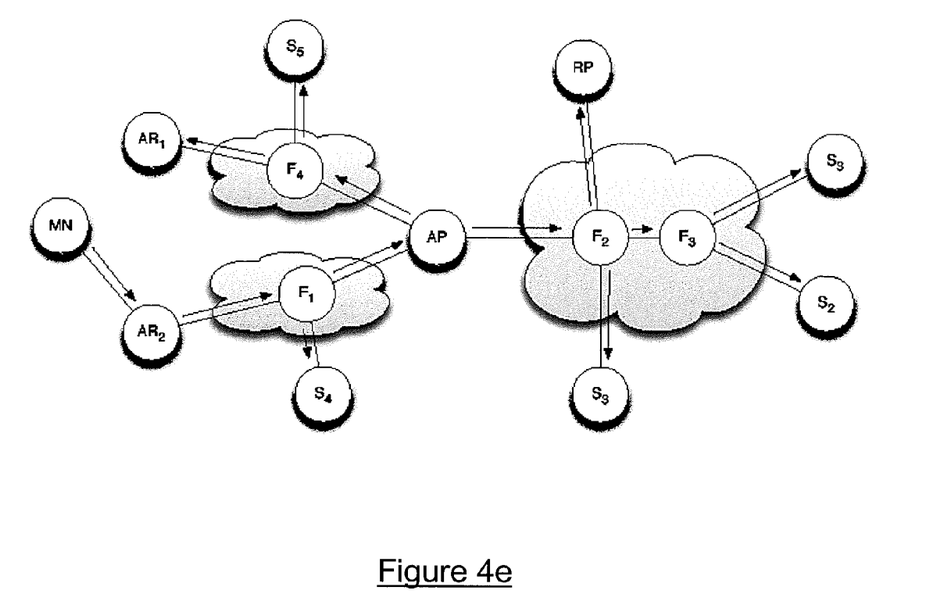

FIG. 4e illustrates the IP SSM PIM re-rooting signalling after movement of the MN:

0. MN gets a new IP address, IP2, from AR2.

Figure 4F:
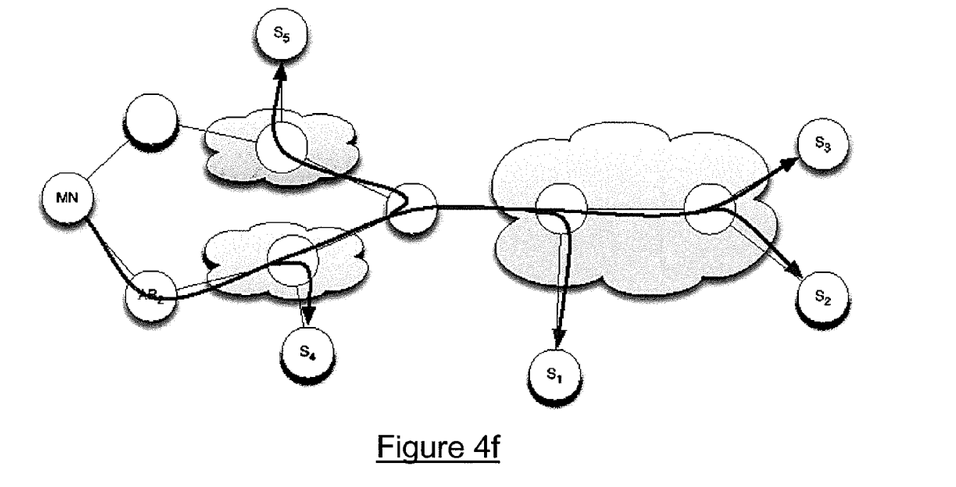

1. MN constructs a new PIM REROOT message, places it in an IPv6 hop-by-hop (HBH) option, and sends a packet to AP.
2. AR2 receives the packet, gets and authenticates the HBH option, and adds itself to the tree.
3. F1 receives the packet, gets and authenticates the HBH option, and reverses the link AP→F1 direction.
4. AP receives the packet, gets and authenticates the HBH option, and reverses the link AP→F1 direction, and resends the packet to G.
5. All other nodes in the tree process the packet and merely mark the source address change AP→IP2.
6. MN stops tunnelling the packets to AP and instead sends them directly to G. FIG. 4f illustrates the IP SSM PIM multicast tree after the second re-rooting.

2. Pure Publish/Subscribe Multicast in the PSIRP Architecture

In the PSIRP project, inter-networking is based on a pure source specific multicast model where each packet conceptually carries a source (publication) identifier and either a stack of multicast labels (see Särelä et al, RTFM, Publish/Subscribe Internet-working Architecture, ICT Mobile Summit, (June 2008)) or a Bloom filter based representation of set of link identifiers (see Jokela et al, LIPSIN: Line-speed Publish/Subscribe Inter-networking, submitted to NSDI'09). In the former case, each forwarding element considers the topmost multicast label in the stack, and in a Multiprotocol Label Switching (MPLS) like fashion replaces the label, pops one label from the stack, or pushes a new label on the stack, and then forwards the packet out through one or more interfaces. There must be state corresponding with the topmost label in the forwarding element or otherwise the packet will be dropped. In the latter case, each forwarding element considers the Bloom filter in the packet, and forwards the packet to those outgoing links that have been added to the Bloom filter. If the Bloom filter does not contain any outgoing links at the forwarding element, the packet will be dropped.

In this context, re-rooting a multicast tree is a potentially expensive operation as it typically requires setting up of new forwarding state, updating forwarding state in a number of forwarding elements, and/or computing a new Bloom filter using full topology information. Hence, even the relatively fast re-rooting algorithms discussed above take a considerable amount of time, potentially hundreds of milliseconds or more in a large and busy network. In particular, we make the following notes:

Source authentication can be based on methods already in place in PSIRP/RTFM, e.g., using hash chains, packet level authentication (PLA), or as outlined in P. Nikander and G. Marias. (2008), "Towards Understanding Pure Publish/Subscribe Cryptographic Protocols", In Pre-proceedings of 16th Security Protocols Workshop, Cambridge, UK, (Apr. 16-18, 2008).

Finding the old tree from the new root potentially takes a number of local broadcast messages at the control plane. These are likely to be expensive as they require slow path operation in each of the forwarding elements. Furthermore, the longer the distance between the new root and the closed forwarding element that participate in the old tree, the larger the number of the messages.

Establishing a forwarding tunnel from the old location to the anchor node is simple and straightforward, requiring a single set-up message to traverse from the sender to the new root, setting up a new forwarding label on each of the forwarding elements on-path (it is assumed that the sender will know this path as a result of the anchor node selection step). Then, to tunnel a packet, the sender simply pushes the new label on the packet before forwarding it to the closest FE, and the anchor node pops the label before forwarding it to the correct tree.

In the make-before-break case, establishing a forwarding tunnel from the new location to the anchor node is equivalent to the establishment of a path from the new location to the anchor node.

In the break-before-make case, establishing new forwarding tunnels for each of the mobile nodes is likely to take too much state in the forwarding elements. Hence, it is proposed to use the Bloom filter stateless approach or to set up a forwarding state shared by all mobile senders that share the anchor node. This reduces the number of states per forwarding element from N(anchor nodes)×N (mobile senders), to only N (anchor nodes).

Figure 5A:
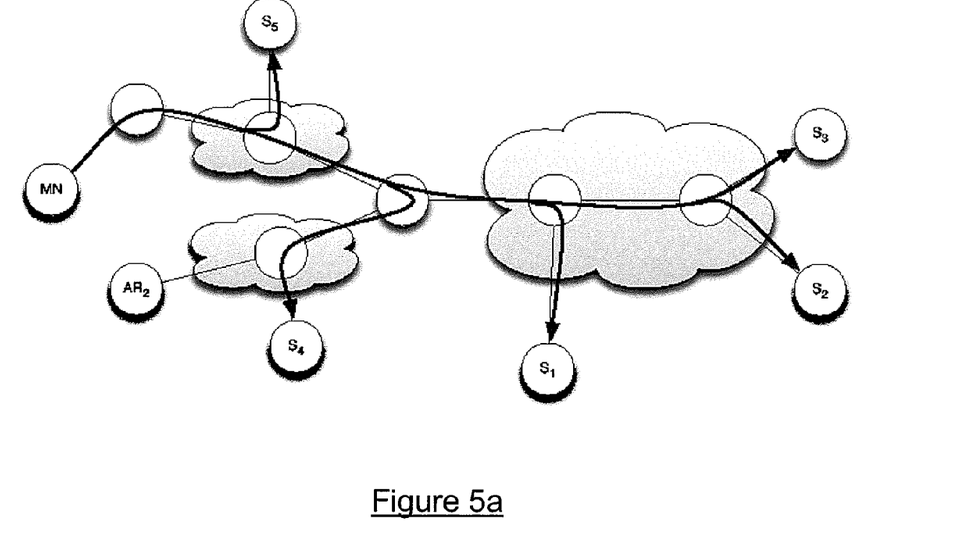
FIGS. 5a to 5d illustrate the processes involved in establishing and maintaining a multicast tree in the context of the PSIRP proposals.
Figure 5B:
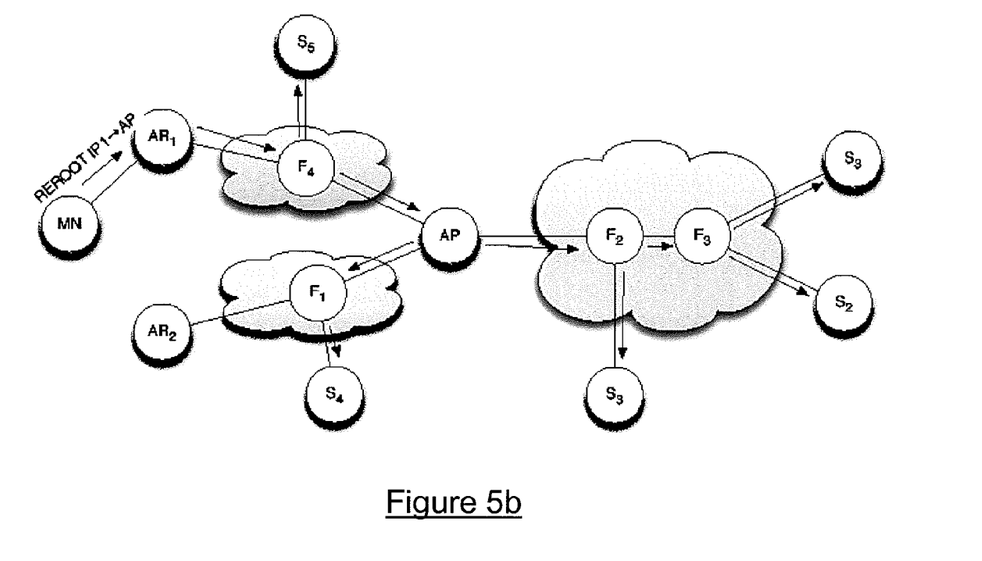

FIG. 5a illustrates a PSIRP RTFM multicast tree after the initial formation. FIG. 5b illustrates PSIRP RTFM re-rooting signalling before movement, involving the steps of:
1. MN constructs a REROOT message and sends a packet to the AP via the signalling plane.
2. AR1 receives the packet, authenticates it, and removes itself from the tree.
3. F4 receives the packet, authenticates it, and reverses the link F4→AP direction.
4. AP receives the packet, authenticates it, and reverses the link F4→AP direction.
6. MN starts to tunnel the packets to AP, which then sends them along the re-rooted tree.

Figure 5C:
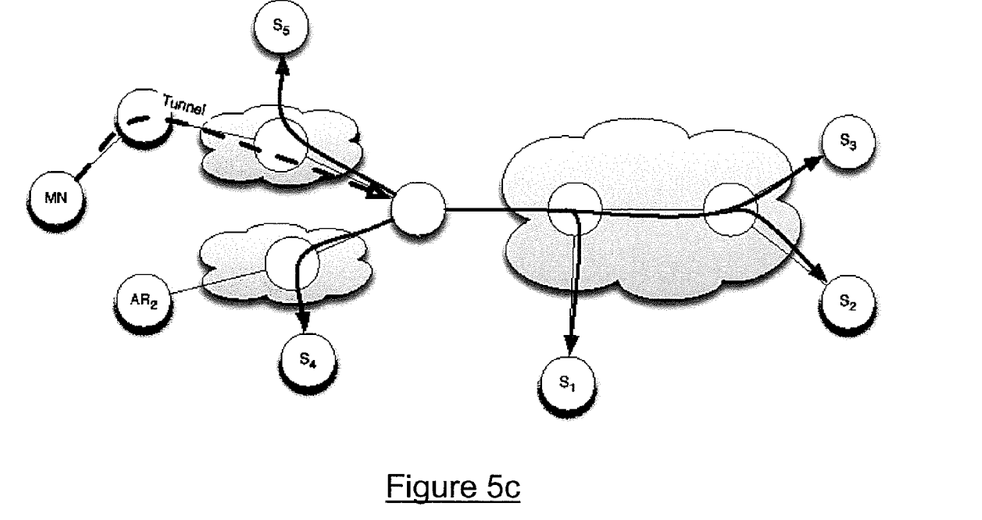

FIG. 5c illustrates the PSIRP RTFM multicast tree after the first re-rooting

Figure 5D:
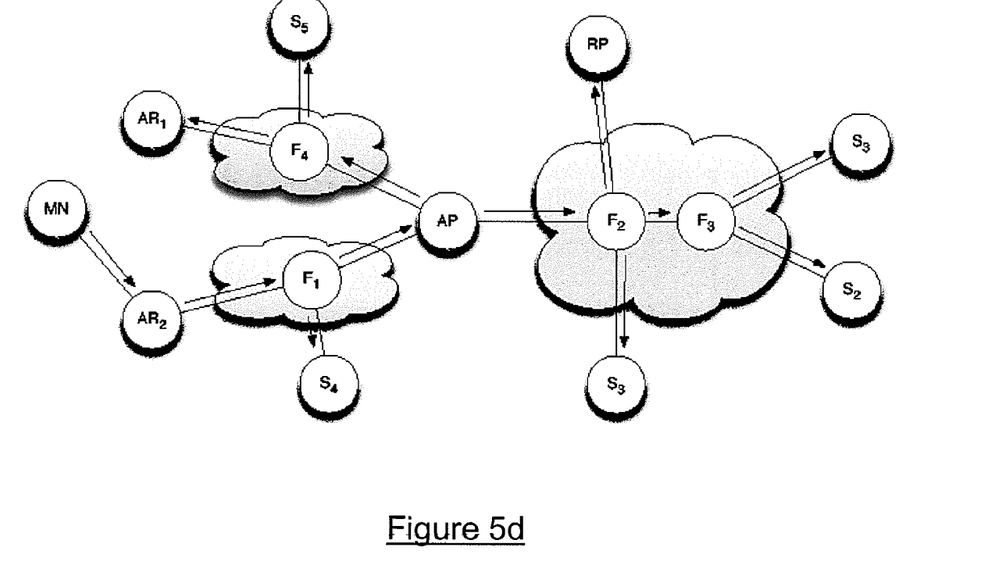

FIG. 5d illustrates PSIRP RTFM re-rooting signalling after movement, involving the steps of:
1. MN constructs a REROOT message, and sends a packet to AP via the signalling plane.
2. AR2 receives the packet, authenticates it, and adds itself to the tree.
3. F1 receives the packet, authenticates it, and reverses the link AP→F1 direction.
4. AP receives the packet, authenticates it, and reverses the link AP→F1 direction.
5. MN stops tunnelling the packets to AP and instead sends them directly to G.

Figure 6:
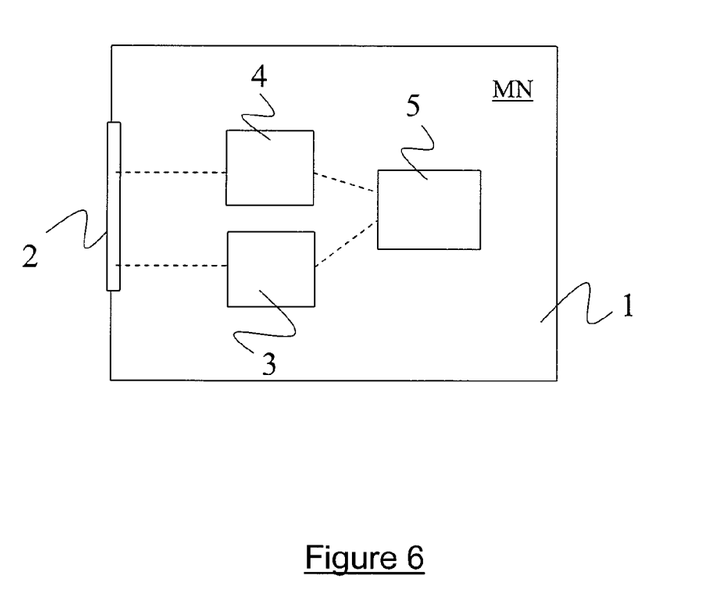
FIG. 6 illustrates schematically a mobile client acting as multicast sender.

FIG. 6 illustrates schematically a mobile node 1 configured to operate as a sender within a multicast group. The mobile node comprises an interface 2 coupled to an access network, e.g. a cellular telephone network or WLAN. A multicast session establishment unit 3 is coupled to the interface and establishes, when required a multicast group in a packet data network. This unit 3 might also join the MN to an existing group, as sender. A further packet sender 4 sends out multicast packets over the interface 2. A multicast mobility handling unit 5 is configured to detect when a mobility event, e.g. a handoff between different access networks, is about to occur. Upon such detection, the unit 5 selects a transfer anchor node and causes the sender 4 to send a REROOT message down the multicast tree, to re-root the tree at the selected anchor node. Thereafter, both prior to and following the mobility event, the sender tunnels multicast packets to the transfer anchor point. Of course, once the mobile node's location is stable, the tree may be re-rooted to a new, local anchor node or to the mobile node itself.

Figure 7:
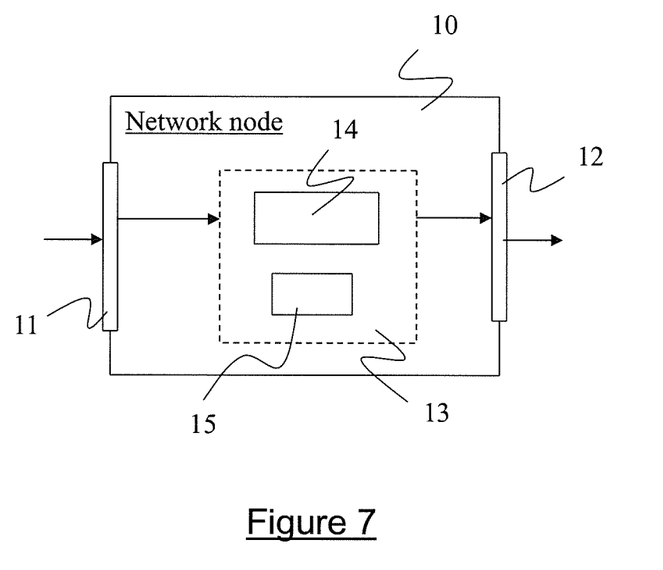
FIG. 7 illustrates schematically a network node, for example acting as multicast anchor node.

FIG. 7 illustrates schematically a network node, which may be, for example, an IP router. The node 10 comprises (multiple) ingress and egress interfaces 11 and 12, and a multicast protocol unit 13 that is responsible for maintaining recipient registrations for multicast groups. The unit includes, in particular, a memory 14 that stores the egress interfaces over which packets, belonging to a given multicast group, must be sent, when received on an ingress interface. It also includes message authenticator 15 that is arranged to authenticate received re-rooting messages based upon public key cryptography as described above.

Figure 8:
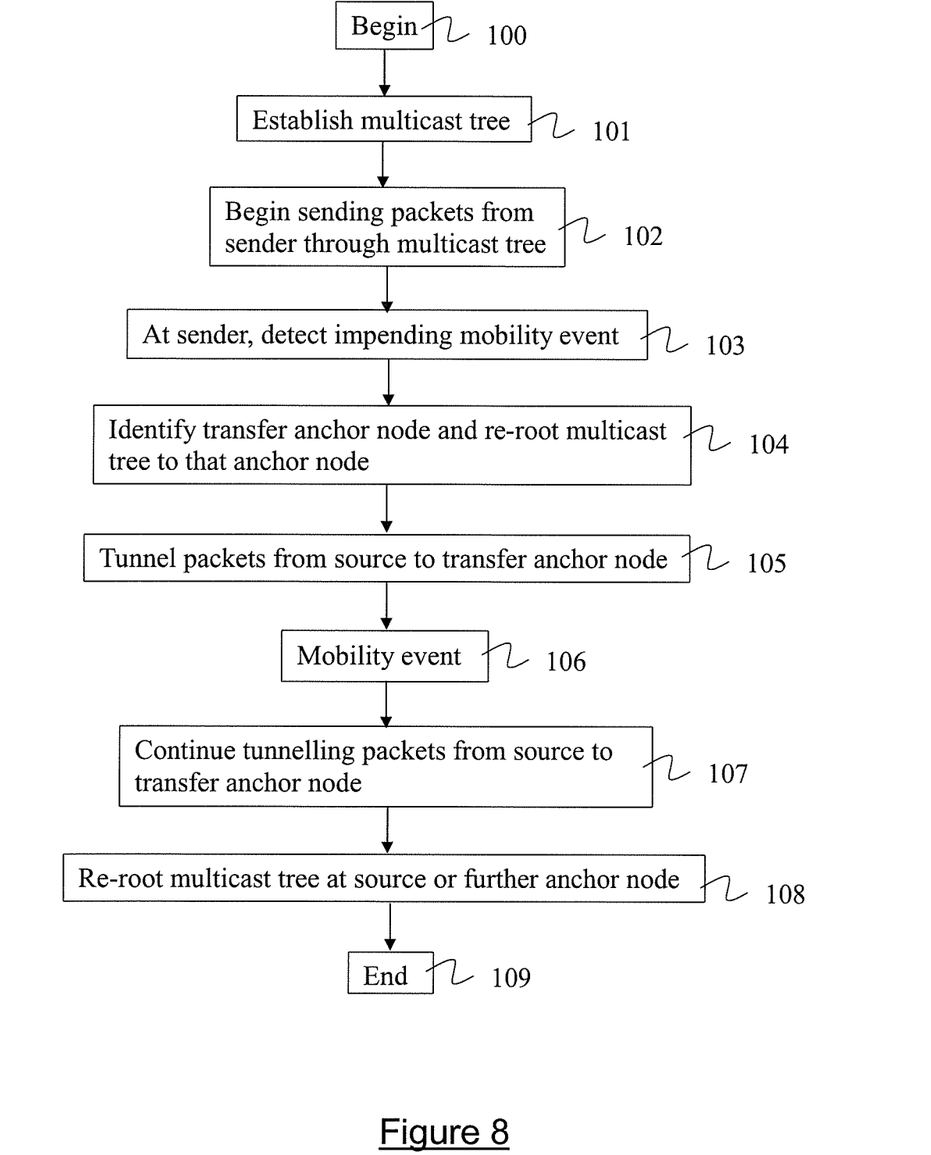
FIG. 8 is a flow diagram illustrating a process for handling a mobility event in the context of a multicast group.

FIG. 8 is a flow diagram illustrating key steps in the mobility handling method described above. The process begins at step 100, followed by the establishment of a multicast tree at step 101. At step 102, the sender begins sending packets down the multicast tree. The sender may be the anchor node, or an anchor node within the network may be defined. At step 103, the sender detects an impending mobility event and, in response, at step 104 identifies a transfer anchor node and re-roots the tree to that anchor node. At step 105, the sender begins tunnelling packets to the transfer anchor node. The mobility event, e.g. handover to a new access network, occurs at step 106. The sender continues to tunnel packets to the transfer anchor node at step 107, following the mobility event. Once the location of the sender is stable, at step 108, the tree is re-rooted to the source or to a further, local anchor node. The process ends at step 109.

It will be appreciated by the person of skill in the art that various modifications may be made to the above described embodiments without departing from the scope of the present invention.

The invention claimed is:

1. A method of handling mobility of a sender in a multicast packet sending scenario, the method comprising:
   establishing a multicast tree across a packet data network and transmitting multicast packets from the sender to a plurality of receivers via said multicast tree;
   upon detection of an impending mobility event and prior to the mobility event in respect of said sender, identifying a suitable transfer anchor node within said network;
   re-rooting said multicast tree to said transfer anchor node;
   transmitting multicast packets from said sender to said transfer anchor node and injecting the packets into the multicast tree at said transfer anchor node; and
   following said mobility event, continuing to transmit multicast packets from said sender to said transfer anchor node for injection into the multicast tree.

2. A method according to claim 1, wherein said sender is located at a mobile user terminal or at a mobile router.

3. A method according to claim 1, wherein said step of establishing a multicast tree across a packet data network comprises rooting said multicast tree at a first anchor node, and said step of re-rooting said multicast tree to said transfer anchor node comprises re-rooting the tree from said first anchor node to said transfer anchor node.

4. A method according to claim 1, wherein said step of establishing a multicast tree across a packet data network comprises rooting said multicast tree at said sender, and said step of re-rooting said multicast tree to said transfer anchor node comprises re-rooting the tree from said sender to said transfer anchor node.

5. A method according to claim 1 and comprising, following said mobility event and after the transmission of multicast packets from said sender to said transfer anchor node for injection into the multicast tree, re-rooting said multicast tree from said transfer anchor node to either the sender at its new location or to a further anchor node local to the sender's new location.

6. A method according to claim 1, the step of transmitting multicast packets to an anchor node comprising tunnelling the packets to the anchor node such that the packets comprise an inner header having the multicast group address as destination address, and an outer header having the anchor node as destination address.

7. A method according to claim 1, wherein a multicast group address of a multicast group is a Cryptographically Generated Address.

8. A method according to claim 7, wherein a re-rooting of a multicast tree is achieved by sending a re-rooting message across the tree, the message containing the multicast group address, an associated public key, and a signature generated using a private key associated with said Cryptographically Generated Address, nodes within the multicast tree authenticating the re-rooting message using the signature and the associated public key.

9. A method according to claim 1, wherein a multicast group address of a multicast group is an Overlay Routable Cryptographic Hash Identifier.

10. A method according to claim 9, wherein a re-rooting of a multicast tree is achieved by sending a re-rooting message across the tree, the message containing the multicast group address, the associated public key, and a signature generated using a private key associated with said Overlay Routable Cryptographic Hash Identifier, nodes within the multicast tree authenticating the re-rooting message using the signature and the associated public key.

11. A method according to claim 9, wherein a re-rooting of a multicast tree is achieved by sending two consecutive re-rooting messages across the tree, the messages containing the multicast group address, the first message containing a hash value formed with a hash chain rooted at said Overlay Routable Cryptographic Hash Identifier and the second message revealing the corresponding next hash value from the hash chain, nodes within the multicast tree authenticating the first re-rooting message using the next hash value in the second message.

12. A mobile node configured to operate as a sender of packets for at least one multicast group across a packet data network, the mobile node comprising:
   a multicast session establishment or joining unit for establishing or joining a multicast tree;
   a multicast packet sender for transmitting multicast packets to a plurality of receivers via said multicast tree;
   a multicast mobility handling unit arranged, upon detection of an impending mobility event prior to the mobility event in respect of said sender, to identify a suitable transfer anchor node within said network, to re-root said multicast tree to said transfer anchor node, and to cause said multicast packet sender to transmit multicast packets to said transfer anchor node for injection into the multicast tree both before and after said mobility event.

13. A mobile node according to claim 12, said multicast packet sender being configured to tunnel multicast packets to said transfer anchor point.

14. A mobile node according to claim 12, said multicast mobility handling unit being configured, following said mobility event, to re-root said multicast tree at a further anchor point or at itself.

15. A node configured to route packets within a packet data network and comprising:
   a multicast protocol unit for allowing the node to be integrated into a multicast tree, and configured to authenticate a tree re-rooting instruction relating to a given multicast tree using a public key associated with a cryptographically generated multicast group identity or address; and
   a multicast packet sender for transmitting multicast packets to a plurality of receivers via said multicast tree.

\* \* \* \* \*

UNITED STATES PATENT AND TRADEMARK OFFICE
CERTIFICATE OF CORRECTION

PATENT NO. : 8,583,919 B2
APPLICATION NO. : 13/123953
DATED : November 12, 2013
INVENTOR(S) : Särelä et al.

It is certified that error appears in the above-identified patent and that said Letters Patent is hereby corrected as shown below:

On the Title Page, Item (12), delete "Sarela et al" and insert -- Särelä et al --, therefor.

On the Title Page, Item (75), under "Inventors", in Column 1, Line 1, delete "Sarela," and insert -- Särelä, --, therefor.

On the Title Page, Item (73), under "Assignee", in Column 1, Line 1, delete "Telefonaktiegolaget" and insert -- Telefonaktiebolaget --, therefor.

On Title Page 2, Item (56), under "OTHER PUBLICATIONS", in Column 2, Line 5, delete "OverlayRoutable" and insert -- Overlay Routable --, therefor.

In the Specification

In Column 6, Line 26, delete "(Dec. 1991)]" and insert -- (Dec. 1991) --, therefor.

In Column 7, Line 6, delete "$V_T \subseteq V$" and insert -- $V_T \subseteq V$ --, therefor.

In Column 7, Line 17, delete "$A \cap V_1 = \theta$" and insert -- $A \cap V_1 = \emptyset$ --, therefor.

In Column 7, Line 19, delete "u☐C and u☐A," and insert -- u ∉ C and u ∉ A, --, therefor.

In Column 7, Line 24, delete "B:=θ" and insert -- B:=∅. --, therefor.

In Column 7, Line 42, delete "u☐$V_T$," and insert -- u ∉ $V_T$, --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,583,919 B2

In Column 10, Line 17, delete "formation" and insert -- formation. --, therefor.

In Column 12, Line 30, delete "re-rooting" and insert -- re-rooting. --, therefor.